United States Patent
Mullin (10) Patent No.: US 6,753,867 B2
(45) Date of Patent: *Jun. 22, 2004

(54) SOFTWARE ARCHITECTURE WHICH MAINTAINS SYSTEM PERFORMANCE WHILE PIPELINING DATA TO AN MFP AND USES SHARED DLL

(75) Inventor: Thomas P. Mullin, Irvine, CA (US)

(73) Assignees: Toshiba American Information Systems, Irvine, CA (US); Kabushiki Kaisha Toshiba, Kanagawa-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/845,854

(22) Filed: Apr. 30, 2001

(65) Prior Publication Data

US 2003/0011605 A1 Jan. 16, 2003

Related U.S. Application Data

(62) Division of application No. 09/119,280, filed on Jul. 20, 1998, now Pat. No. 6,252,614.

(51) Int. Cl.[7] .................................................. G06T 1/20
(52) U.S. Cl. ........................ 345/506; 345/535; 358/1.15
(58) Field of Search ................................ 345/501, 502, 345/506, 505, 560, 536–538, 531, 541, 535; 358/1.15–1.17, 442–444, 447, 448; 710/56

(56) References Cited

U.S. PATENT DOCUMENTS 5,689,730 A * 11/1997 Wakasugi ..................... 710/56

* cited by examiner

Primary Examiner—Kee M. Tung
(74) Attorney, Agent, or Firm—Tucker Ellis & West LLP (57) ABSTRACT

A throttled data pipeline having a limited data-transfer rate for conserving system resources is disclosed. The throttled data pipeline of the present invention includes a source, a destination and a throttling device. The throttling device of the present invention is interposed between the source and the destination, and is adapted to limit data-transfer rates through the throttled data pipeline in accordance with predetermined criteria. By limiting data-transfer rates through the throttled data pipeline, system resources of the host computer, which would otherwise be wasted, are conserved. The throttled data pipeline of the present invention is configured to allow for fast and efficient transfers of data during low throughput operations when system resources are not significantly taxed. When high-throughput data transfers or other taxing operations which would otherwise detrimentally consume significant system resources are required of the throttled data pipeline, the data transfer rate of the throttled data pipeline is limited.

12 Claims, 8 Drawing Sheets

SOFTWARE ARCHITECTURE WHICH MAINTAINS SYSTEM PERFORMANCE WHILE PIPELINING DATA TO AN MFP AND USES SHARED DLL

CROSS REFERENCE TO RELATED APPLICATIONS

This application is a Divisional Application of U.S. patent application Ser. No. 09/119,280 U.S. Pat. No. 6,252,614 filed on Jul. 20, 1998.

RELATED APPLICATION INFORMATION

This application is related to copending U.S. application Ser. No. 09/016,190 entitled "Method of Administering a Work Group Fax Device," which is commonly assigned and the contents of which are expressly incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure, as it appears in the Patent and Trademark Office patent files or records, but otherwise reserves all copyright and trade dress rights whatsoever.

BACKGROUND OF THE INVENTION

1. Field of the Invention

The present invention relates generally to image forming apparatuses and, more particularly, to methods and apparatuses for controlling a transfer rate of image data within the image forming apparatuses.

2. Description of Related Art

As new computer systems and applications are developed and introduced into the marketplace, a primary motivating element in the evolution of economical and effective products continues to be increased processing speed. Regardless of the particular task at hand, few would disagree that, other things being equal, the quicker product will usually claim the market share.

In a typical networked multi-user computer environment, a number of individual workstations are linked together through a high speed network, usually a local area network (LAN). Also linked on the LAN are one or more peripheral devices such as printers, facsimile machines, scanners or plotters. One or more file servers are also linked to the network and serve to manage allocation of the devices to workstations which request the use of the devices. The allocation procedures typically involve accepting requests, determining the address of the device requested, maintaining queues, establishing priorities and relaying data from the workstation to the device.

Typically when a workstation user wishes to determine the status of a device that is networked on a LAN, the method available depends upon the intelligence of the device. The earlier generation of peripherals were "unintelligent," or perhaps, better "uncommunicative." They accepted data from the LAN and processed it according to instructions, but were incapable of relaying status information back to the LAN. A workstation user, concerned about the status of a device to which he or she had sent a job, would have to leave the workstation to physically examine the device.

A server, such as a file server or a print server, might be able to provide some information regarding the status of a print job. However, this status information related to the status of the print job in a print queue, and the print queue was neither created, maintained nor serviced by the printer. If a print job was removed from the print queue, one could infer that the printer was handling the print job. However, the status of the print job as it was handled by the printer could not be ascertained. For example, absence of a print job from the print queue could mean that the print job was complete, or it could also mean that the printer had received the print job into its buffer and was still processing the print job. Other features of such a print queue manager were reprioritization of print jobs and deletion of print jobs.

More recently, peripheral devices have become available which are able to perform a number of related functions. These devices are known as multifunction peripherals (MFPs).

The Telecommunication Industry Association (TIA) has provided an MFP interface standard known as the IS-650 Multifunction Peripheral Industry Interface Standard, Level 1 (MFPI-1) specification version 5.5. According to this standard, an MFP is:

Computer equipment used to scan, print, facsimile transmit, and/or copy documents. It also may have the capability to provide data modem and other voice telephony services. The MFP may be an integrated unit or may be several discrete units that are interconnected on the same communication channel to the Host or interconnected using several different channels. One or more of the subsystems may be omitted from the MFP.

A "Host" as defined in MFPI-1 is any terminal or computer capable of providing commands and data to operate a peripheral, and in practice is a computer of any size, or a group of network nodes on a given local area network. As used herein, a "host" is a generic Host, providing the quality of functionality specified in MFPI-1 without necessarily adhering to the specification. A "subsystem" according to MFPI-1 is one of several logical peripheral units, such as printer, scanner, fax-data-voice (FDV) modem, internal memory, stand-alone controller (SAC), operator console and others which may exist in the MFP or Host. The Host and the MFP communicate through a "channel."

An MFP can operate in stand-alone mode, wherein two or more subsystems are used without interaction with the Host. One example of this is copying. Stand-alone operations may occur at the same time that the Host is accessing a different subsystem for a Host-controlled operation.

In a networked system where many workstations are sharing peripherals, the use of a multifunction peripheral is a mixed blessing. On the one hand, rather than providing, for example, two different scanner functions (one for reading documents for facsimile transmission, one for reading documents for copying) and three different printing functions (one for printing computer generated documents, one for printing documents received through facsimile transmission, and one for printing documents that have been scanned in for copying), a single scanning function and a single printing function perform the work of printer, copier and facsimile machine. On the other hand, the single multifunction peripheral is used at least as often as all of the individual devices would have been used alone. Previously, where there was one user wishing to print a document, one user wishing to transmit a document via facsimile, and one user wishing to copy a document, each would ordinarily each have directed his or her task to a separate machine, and thus not interfere with one another. If any one of these devices was busy or overloaded, the others could perform unimpeded. With a single machine performing all three functions (in our example), reliable processing speeds are more important to ensuring the productivity enhancing capabilities and cost savings of the MFPs. Having many processes operating in the MFP at any given time can severely tax or overload the system resources of the MFP.

MFPs have generally been somewhat simple as to programmability and functionality. A conventional MFP may be confined to DOS-based controllers or dedicated/specific purpose boards. There has been little, if any recognition of the problem of processing throughput.

SUMMARY OF THE INVENTION

The previously described problems are solved in a software architecture which maintains system performance while pipelining data in an image processing system. System resources of a host are efficiently apportioned by a data storage and retrieval unit (DSRU) between a image data processing processes in the host. The image data processing processes involves a transfer of image data from a respective originator service to a respective recipient service.

In accordance with the method, the DSRU identifies an available number of face buffers based upon available system resources. After one of the services requests a face buffer from the DSRU, the DSRU identifies an available number of face buffers which meet the requested criteria. If at least one face buffer of the requested type is available, then the DSRU returns a location of the one available face buffer to the requesting service. If the DSRU is unable to identify any face buffers of the requested type, then the DSRU delays until at least one face buffer of the requested type becomes available.

Still further objects and advantages attaching to the device and to its use and operation will be apparent to those skilled in the art from the following particular description.

DESCRIPTION OF THE DRAWINGS

Further objects of this invention, together with additional features contributing thereto and advantages accruing therefrom, will be apparent from the following description of a preferred embodiment of the present invention which is shown in the accompanying drawings with like reference numerals indicating corresponding parts throughout and which is to be read in conjunction with the following drawings, wherein.

These and additional embodiments of the invention may now be better understood by turning to the following detailed description wherein an illustrated embodiment is described.

DETAILED DESCRIPTION OF THE INVENTION

Throughout this description, the preferred embodiment and examples shown should be considered as exemplars, rather than limitations on the apparatus and methods of the present invention.

Figure 1:
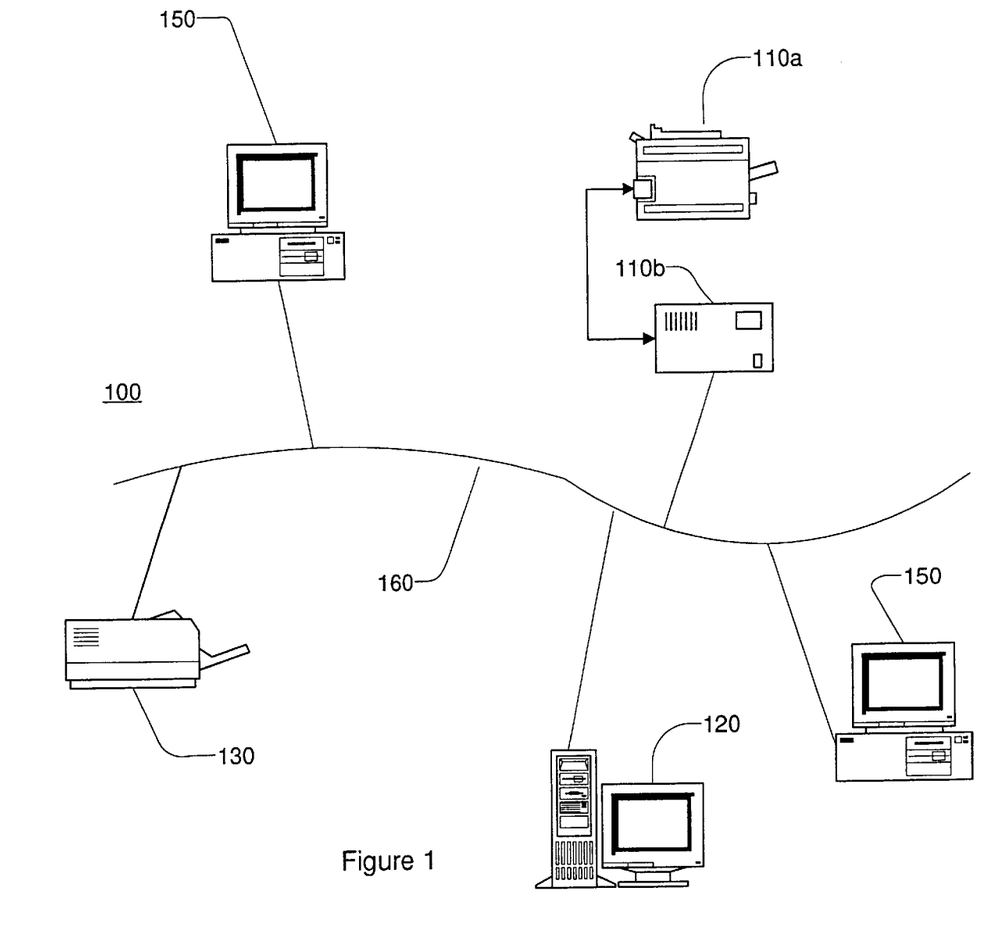
FIG. 1 is a block diagram of a LAN including a plurality of multifunction peripherals.

Referring now to FIG. 1 there is shown a block diagram of a local area network (LAN) 100 in accordance with the present invention. The LAN 100 includes a file server 120, printer 130, workstations 150, and a Host 110b coupled to one another via network communications lines 160. The file server 120 and workstations 150 are preferably those well known in the art, such as computers having Intel Corporation (Santa Clara, Calif.) microprocessors and running Microsoft Corporation (Redmond, Wash.) Windows or Windows NT operating systems. A multifunction peripheral (MFP) 110a is coupled to the Host 110b. The LAN 100 may also include hubs, routers and other devices (not shown).

Before proceeding to describe the LAN 100, a few terms are defined. By "file server," it is meant a computer which controls access to file and disk resources on a network, and provides security and synchronization on the network through a network operating system. By "server," it is meant hardware or software which provides services to other hardware or software. By "workstation," it is meant a client computer which routes commands either to its local operating system or to a network interface adapter for processing and transmission on the network. A workstation may function as a server by including appropriate software, and may be for example, a print server, archive server or communication server. By "software" it is meant one or more computer interpretable programs and modules related and preferably integrated for performing a desired function. A "multifunction peripheral" is a peripheral which provides the functions of more than one peripheral, typically providing printing and at least one of: copying, scanning and faxing.

Figure 2:
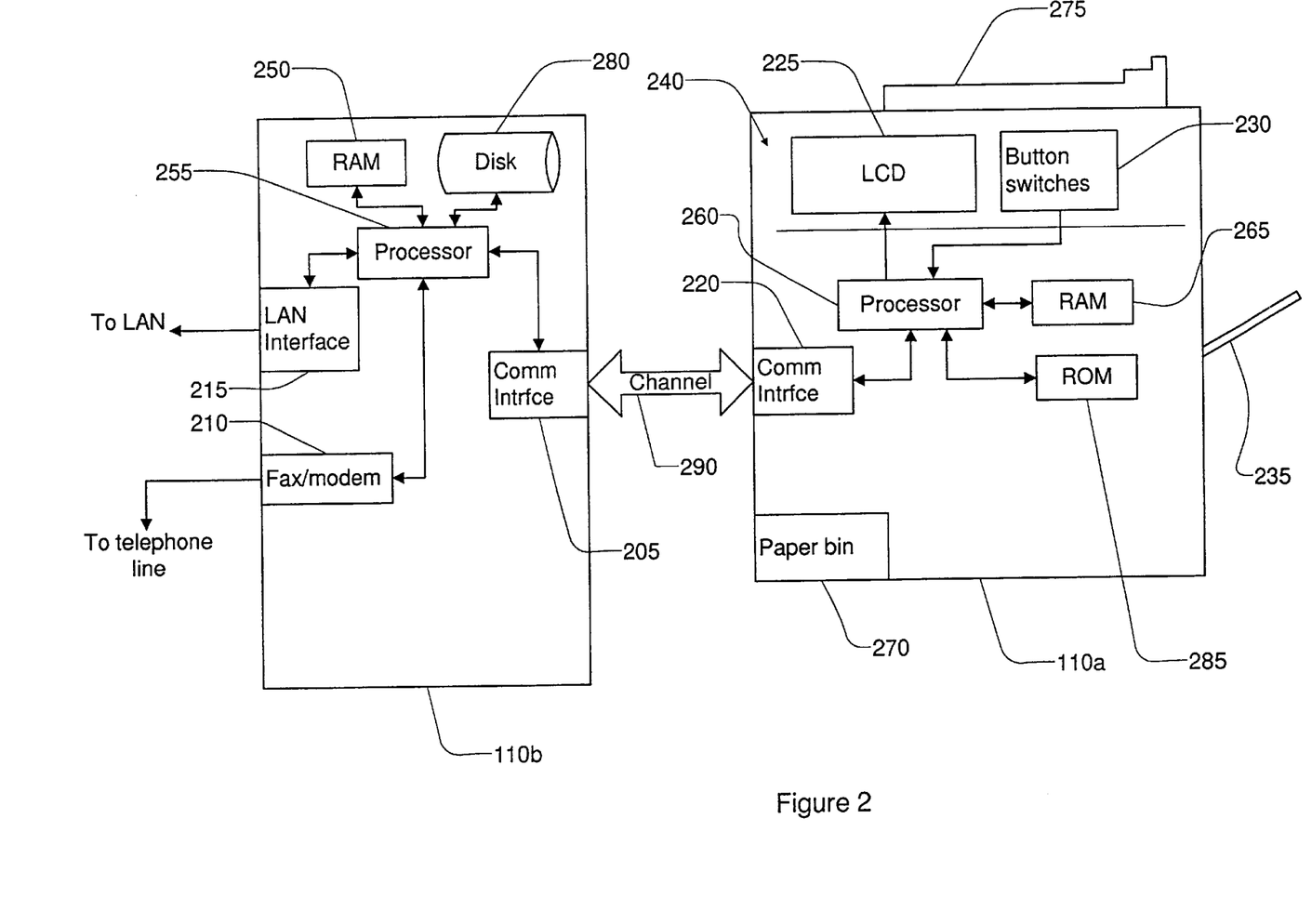
FIG. 2 is a block diagram of a data processing system including a Host and an MFP.

Turning now to FIG. 2, there is shown a block diagram of a data processing system comprising the MFP 110a and the Host 110b. The MFP 110a preferably comprises a high output digital copier having a communications interface 220, which as presently embodied comprises a small computer systems interface (SCSI). The MFP 110a further preferably comprises a hardware and software interface which allows the MFP 110a to receive rasterized print jobs from the Host 110b, manage the print jobs as well as its own copy jobs, and print the print jobs. The hardware and software interface of the MFP 110a further allows the MFP 110a to forward facsimile send jobs from the MFP 110a to a fax/modem 210 in the Host 110b. The MFP 110a includes a short term memory 265, which preferably comprises random access memory (RAM) and a processor 260 in which programs are stored and run, respectively, for controlling the functions of the MFP 110a. The MFP 110a preferably also includes a long term memory 285 such as a read only memory (ROM) or electronically programmable read only memory (EPROM). The MFP 110a may also include a disk drive (not shown) for both long term and short term storage. The MFP 110a includes standard components including an automatic document feeder 275, paper bin 270 and paper output tray 235.

The MFP 110a includes a non-fixed display 225, preferably a liquid crystal display (LCD), and a user input device 230, such as button switches. The MFP 110a has user interface software stored in the memory 285 which is responsible for displaying information on the display 225 and interpreting user inputs from the user input device 230. The non-fixed display 225 and user input device 230 comprise an operator console 240, which, together with the user interface software, comprise a panel subsystem.

The Host 110b preferably comprises a server, and is a computer having an Intel processor 255 and running Microsoft Windows NT. To maximize efficiency, there is preferably a one-to-one correspondence between Hosts and MFPs. In conjunction with the processor 255, the Host 110b has a short term memory 250 (preferably RAM) and a long term memory 280 (preferably a hard disk) as known in the art. A fax/modem 210 is for sending and receiving facsimiles via telephone lines. The Host 110b preferably provides storage, for example in long term memory 250, for holding incoming facsimile transmissions for extended periods and in substantial amounts when a hold is placed on printing facsimile jobs. The Host 110b includes a communications interface 205 through which the Host 110b communicates with the MFP 110a via a channel 290. Preferably, the communications interface 205 is configured as a SCSI Host.

The Host 110b further preferably comprises a hardware 215 and software interface which allows the Host 110b to receive print jobs and facsimile send jobs from the LAN 100, receive facsimile jobs from the MFP 110a and transmit rasterized print jobs to the MFP 110b. The Host 110b includes management software stored in the long term memory 280 for managing print jobs, facsimile jobs and scan jobs. The Host 110b rasterizes print jobs received from the LAN 100 into print data (in a form native to the MFP 110a) and transmits the print data to the MFP 110a via the communications interface 205. The Host 110b executes facsimile send jobs, received from either the LAN 100 or the MFP 110a, on the fax/modem 210.

Figure 3:
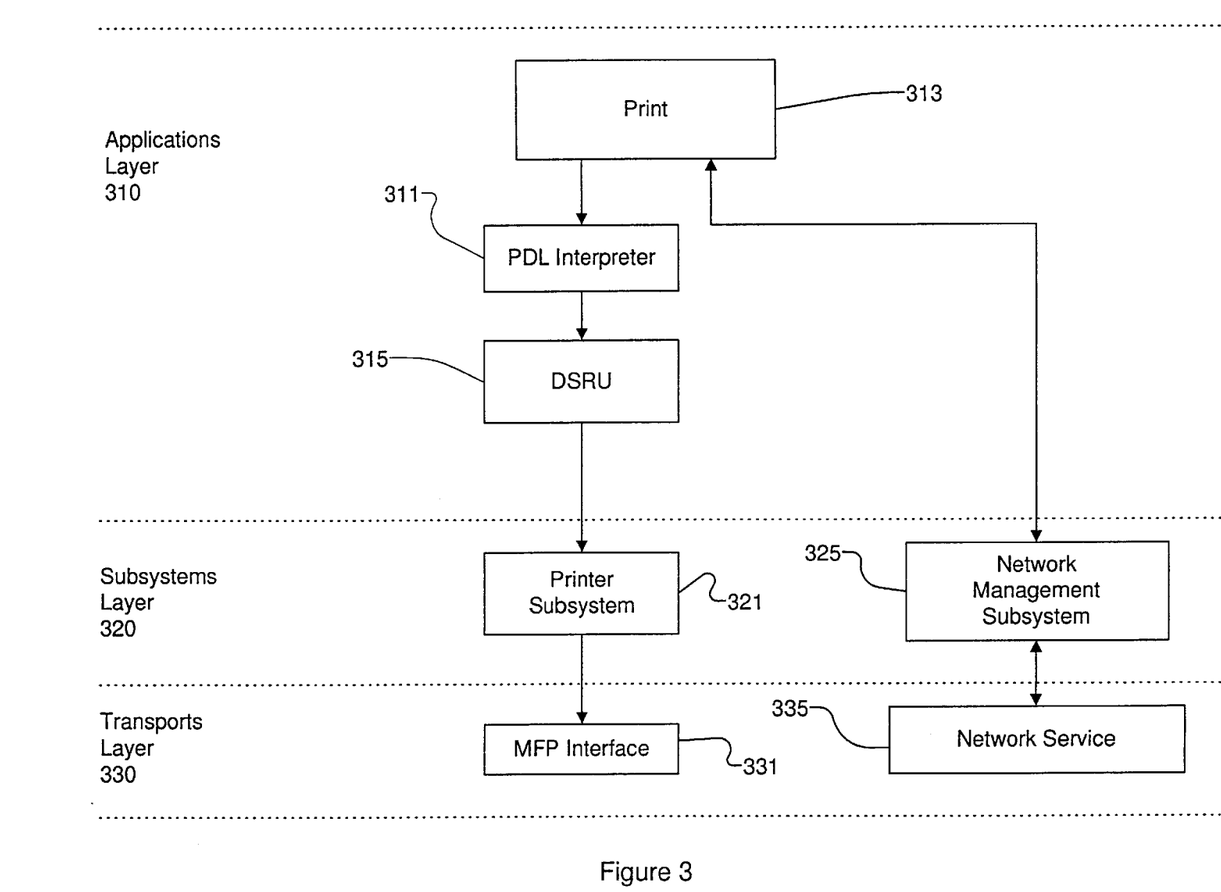
FIG. 3 is a block diagram illustrating a flow of data within a print system in accordance with the invention.
Figure 4:
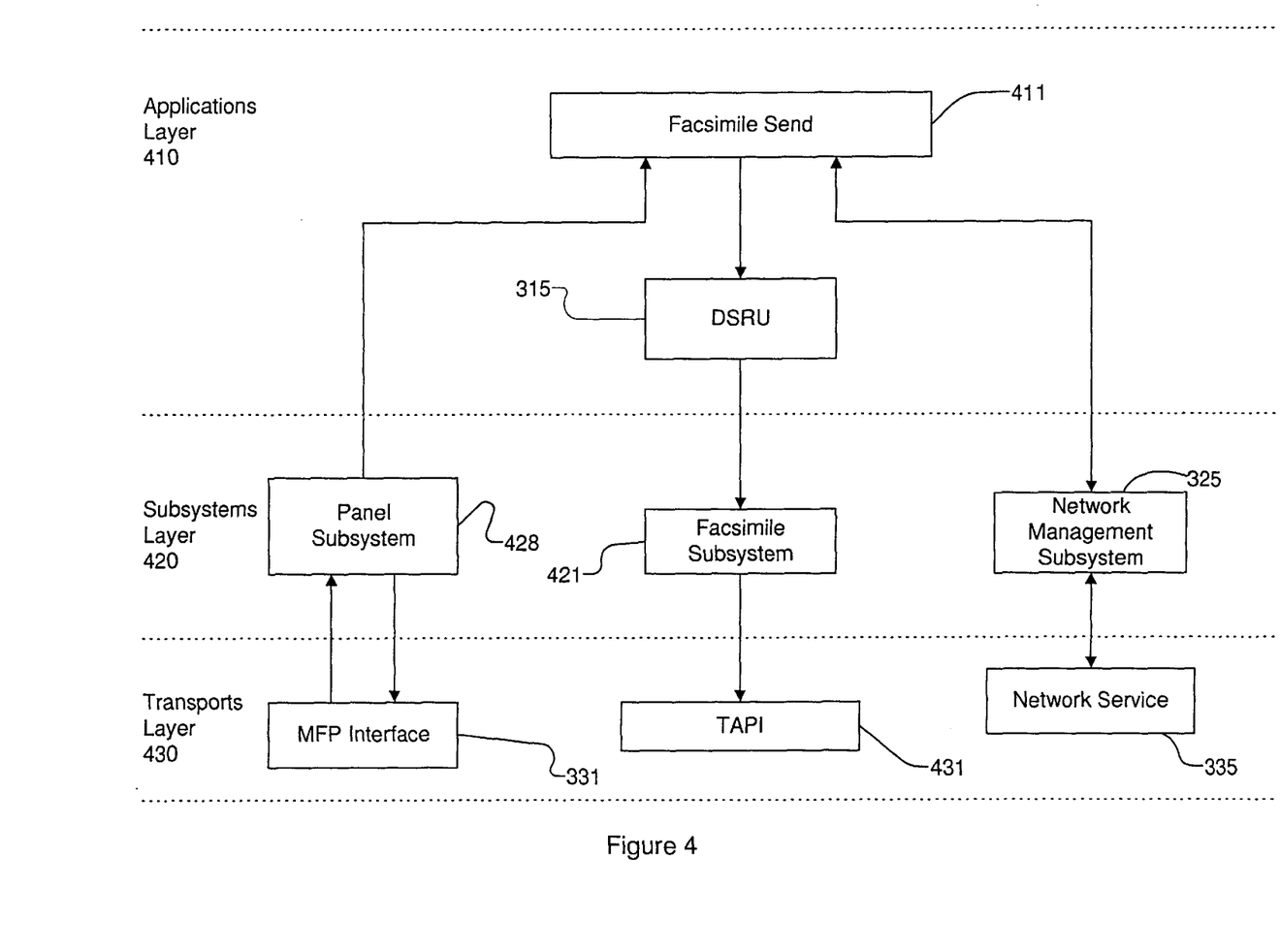
FIG. 4 is a block diagram illustrating a flow of data within a facsimile send system in accordance with the invention.

FIGS. 3 and 4 are block diagrams illustrating data flow in accordance with the invention between several functional units of the Host 110b. In both figures the functional units include applications, host subsystems and transports, and are conceptually organized into applications layers 310, 410, subsystems layers 320, 420 and transports layers 330, 430. As presently embodied, applications are purely software which run on the Host 110b. Host subsystems comprise software for interfacing to I/O devices such as the MFP 110a, the fax/modem 210 and the communications interface 205. Transports comprise software interfaces between higher level functional units, typically host subsystems, and the I/O devices themselves. Applications and host subsystems are services of the Host 110b.

In FIG. 3, a print application 313 is shown in the applications layer 310. In FIG. 4, a facsimile send application 411 is shown in the applications layer 410. Other applications, such as a facsimile receive application and/or a scan application could be included in the applications layer. All of these applications have access to the host subsystems and transports as necessary to carry out their functions. For example, the print application 313 administers the printing of print jobs received by the Host 110b from the workstations 150.

The print application 313 is responsive to control messages sent by the workstations 150 for controlling how print jobs received from the workstations 150 are processed. In an alternative embodiment, the print application 313 is also responsive to control messages sent by the MFP 110a for controlling how print jobs received from the workstations 150 are processed. The print application 313, in response to the control messages, can then act upon and respond differently to other functional units. Also included in the applications layer 310 are a page description language (PDL) interpreter 311 and a data storage and retrieval unit (DSRU) 315.

The host subsystems of FIG. 3 include a printer subsystem 321 and a network management subsystem 325. The printer subsystem 321 comprises software which manipulates and transfers a rasterized print job to the MFP 110b. The network management subsystem 325 comprises software for interfacing the Host 110b to the workstations 150 through the LAN interface 215 and LAN 160.

The transport layer 330 includes two functional units: an MFP interface transport 331 and a network service transport 335. The MFP interface transport 331 controls the communications interface 205, and thus communications between the Host 110b and the MFP 110a. The network service transport 335 comprises software for implementing NetBEUI, TCP/IP, IPX/SPX and other transport protocols which are used in network 100 communications.

FIG. 3 also shows data flow between the functional units. The print application 313 receives print commands and control messages from workstations 150 via the network management subsystem 325 from the network service transport 335. In one embodiment, print commands may be sent to the print application 313 from either or both of a Novell print server and a Microsoft Windows NT print spooler, through the network services transport 335. The print application 313 sends print jobs associated with the print commands to the PDL interpreter 311. Data to be printed is then sent from the PDL interpreter 311 to the printer subsystem 321 via the DSRU 315 and, subsequently, sent to the MFP interface transport 331 for printing by the MFP 110a. The PDL interpreter 311 is therefore said to be an originator service because it originates print image data for use by downstream services. Likewise, the printer subsystem 321 is said to be a recipient service because it receives print image data from upstream services Referring now to FIG. 4, the facsimile send application 411 comprises software responsive to control messages sent by the workstations 150 for controlling how facsimile send jobs originating from the workstations 150 and/or the MFP 110a are processed. The facsimile send application 411 can also be configured to be responsive to control messages sent by the MFP 110a for controlling how facsimile send jobs initiated at the MFP 110a and/or received from workstations 150 are processed. The facsimile send application 411, in response to the control messages, can then act upon and respond differently to other functional units. The facsimile send application 411 is an originator service. Also included in the applications layer 410 is the DSRU 315.

The subsystems layer 420 includes the panel subsystem 428, a facsimile subsystem 421 and the network management subsystem 325 (described above with reference to FIG. 3). The panel subsystem 428 comprises software which interprets operations of the control panel 240 and preferably provide user interfaces for the MFP 110a. The facsimile subsystem 421 comprises software which converts a fax job into a data compatible for the fax/modem 210. The facsimile subsystem is a recipient service 421.

Three functional units in the transport layer 430 are also provided. These include the MFP interface transport 330, a TAPI transport 431 and the network service transport 335. The TAPI transport 460 preferably comprises a software layer that effectively insulates applications programs from modem and fax/modem hardware considerations using Microsoft's telephony advanced programming interface (TAPI). The TAPI standard 431 defines both a single front end applications programming interface (API) to which applications developers write to access the Windows telephony features, and a single back-end service provider interface (SPI) for Windows to access telephony hardware and telephony services. Thus, through the TAPI transport 431, TAPI-compliant applications can control the fax/modem 210 on a generic basis.

FIG. 4 also shows how data flows between the functional units. The facsimile send application 411 receives facsimile send commands from the operator console 240 via the panel subsystem 428 and from workstations 150 via the network management subsystem 325. The MFP interface transport 331 is used by the panel subsystem 428 to access and control the control panel 240. The facsimile send application 411 sends facsimile jobs, associated with the facsimile send commands from the MFP 110a and the workstations 150, to the facsimile subsystem 421 via the DSRU 315. The image data from the facsimile send application 411 is subsequently sent by the facsimile subsystem 421 to the TAPI transport 432 for faxing on the fax/modem 210. The TAPI transport 431 provides the facsimile subsystem 421 with access to the fax/modem 210, over which the facsimile messages are sent.

Figure 5:
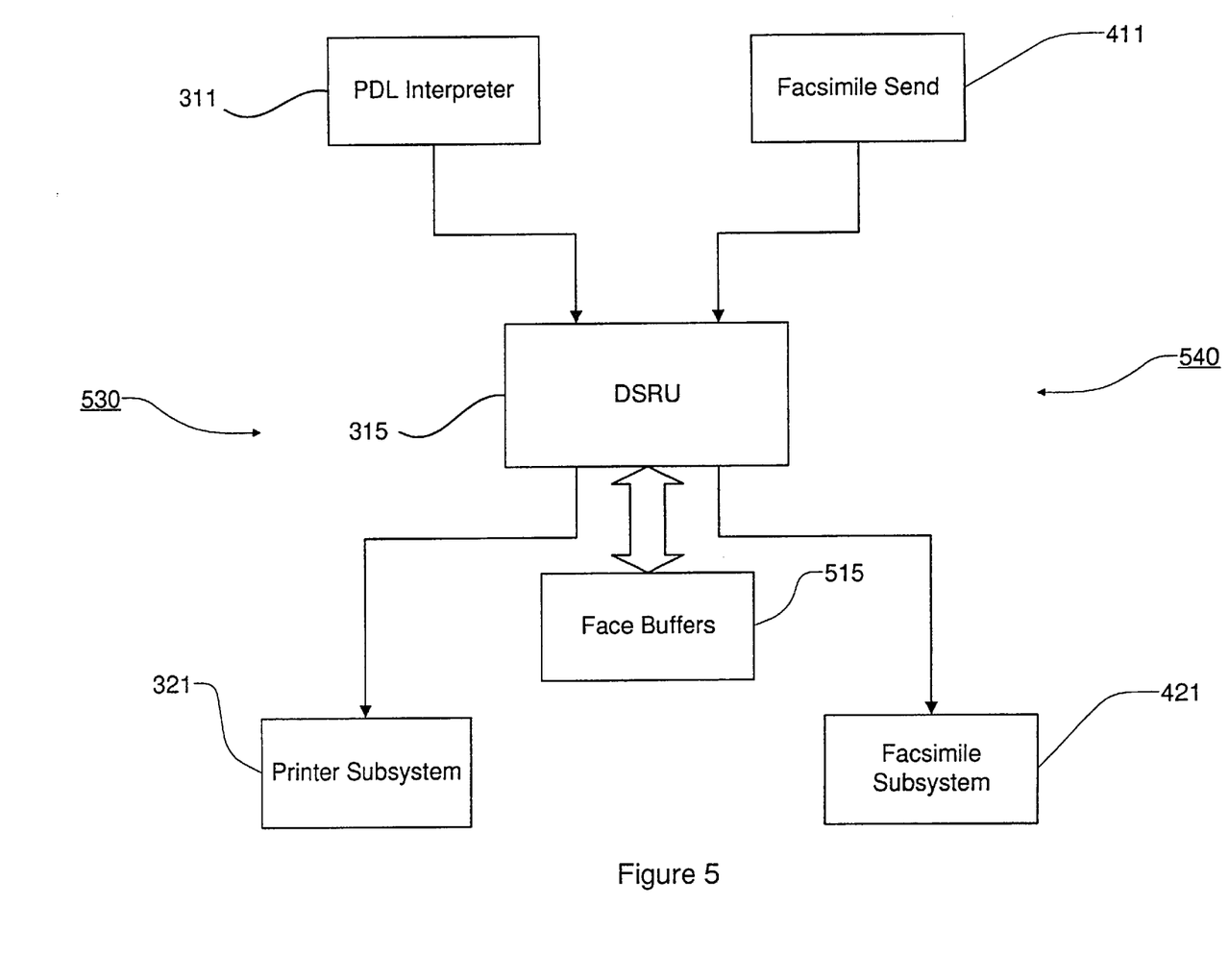
FIG. 5 is a block diagram illustrating a flow of data through a DSRU in accordance with the invention.

Turning now to FIG. 5, the DSRU 315 is shown interposed in a print data pipeline 510 between the PDL interpreter 311 and the printer subsystem 321 and a facsimile send data pipeline 520 between the facsimile send application 411 and the facsimile subsystem 421. Image data from the workstations 150 in the form of print commands is pipelined from the PDL interpreter 311 to the printer subsystem 321. Image data in the form of facsimile send commands from the workstations 150 and/or the MFP 110a is pipelined from the facsimile send application 411 to the facsimile subsystem 421. The scope of the present invention includes having the DSRU 315 throttle additional pipelines between other originator services and recipient services.

The DSRU 315 comprises software which throttles data transfers between originator services and recipient services, and preferably comprises a shared dynamic linked library (DLL). The DSRU 315 effectively conserves the system resources of the Host 110b to promote high pipeline throughput.

Preferably, a user may define at least some of the parameters used by the DSRU 315 to throttle the print pipeline 530 and the facsimile send pipeline 540. For example, a user may adjust the throttling of the DSRU 315 by defining a maximum amount of throttling that can be applied during high-throughput data transfers or other taxing operations that would otherwise detrimentally consume significant system resources. The user might adjust the throttling based upon, for example, the total available amount of system resource of the Host 110b.

In addition, the DSRU 315 preferably can adjust its performance dynamically. One way to achieve this is to have each originator service and recipient service register with the DSRU 315. Then, the DSRU 315 analyzes each new service registering and each old service de-registering and adjusts its configuration accordingly.

FIG. 5 also shows the DSRU interfacing face buffers 515. The face buffers 515 comprise image-data holding memory regions in the memory 250. A "face" is defined herein as all of the image data which will be printed on a single side of one sheet of paper. Thus, one page of a single-sided document to be printed has one face, while one page of a two-sided document has two faces. Data transfers in the pipelines 530, 540 preferably occur in units of faces.

Originator services and recipient services need face buffers of differing types. For example, originator services such as the PDL interpreter 311 and the facsimile send application 411 need face buffers which they can fill with faces for use by the recipient services in their respective pipelines 530, 540. Similarly, recipient services need face buffers which have been filled by the originator service of their respective pipeline. The DSRU 315 responds to requests by the services for face buffers by providing the location in memory 250 of a face buffer of the requested type.

The face buffers 515 are preferably shared with the facsimile receive application (not shown), so that when facsimile messages are received they may be controlled in a manner similar to the control of print jobs.

Figure 6:
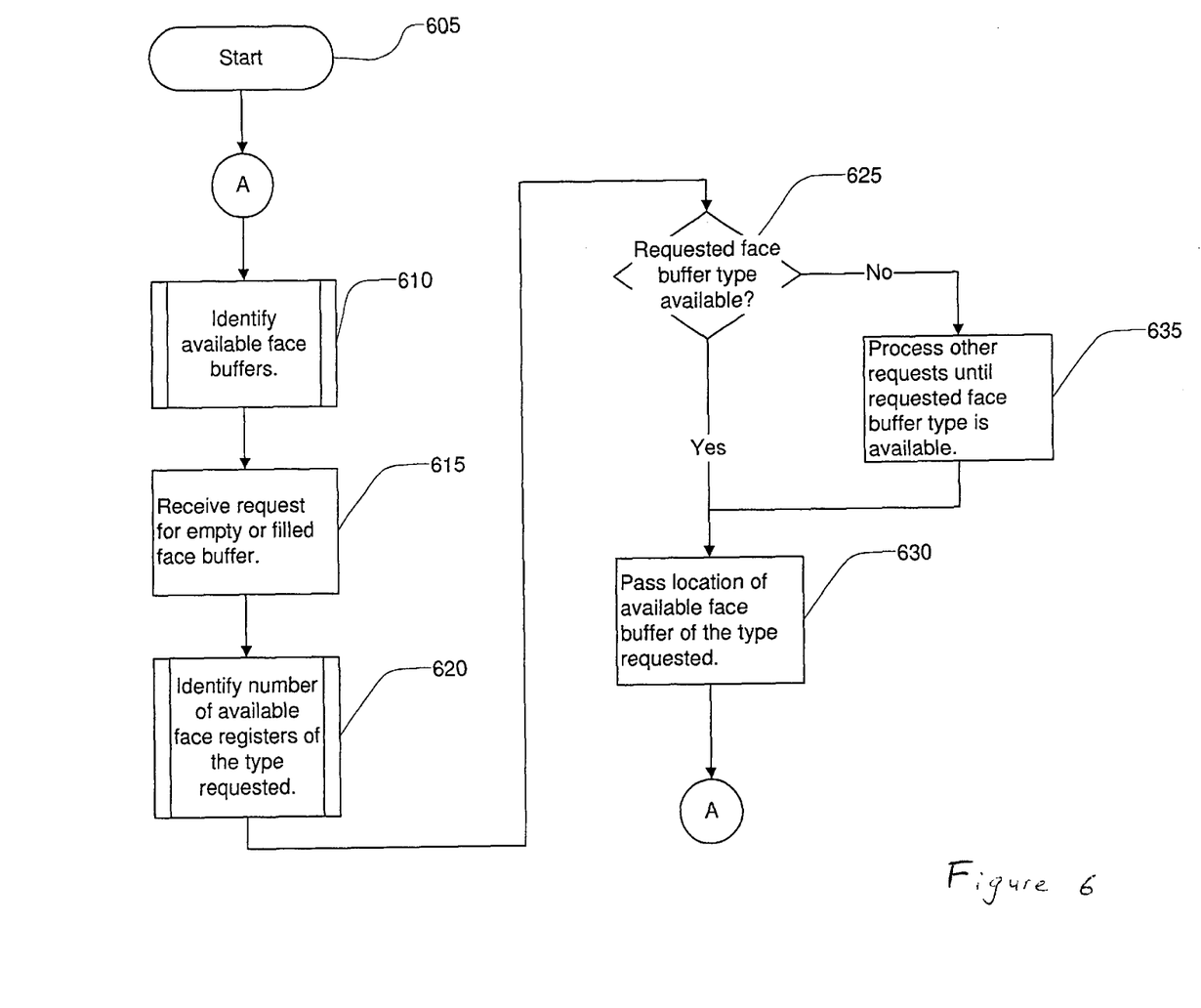
FIG. 6 is a flow chart of a method of using the DSRU of FIG. 5 to throttle a flow of data through both the print system of FIG. 3 and the facsimile send system of FIG. 4 in accordance with the invention.

Referring now to FIG. 6, there is shown a flowchart of the method of the invention. In accordance with the method, system resources of the Host 110b are efficiently apportioned by the DSRU 315 between a first image data processing process in the Host 110b (such as the print pipeline 530) and a second image data processing process in the Host 110b (such as the facsimile send pipeline 540) in the Host 110b. The first process involves a transfer of image data from a first originator service to a first recipient service, such as from the PDL interpreter 311 to the printer subsystem 321. The second process involves a transfer of image data from a second originator service to a second recipient service, such as from the facsimile send application 411 to the facsimile subsystem 421.

After the method is begun (step 605), the data storage and retrieval unit identifies an available number of face buffers in the Host's memory 250 (step 610). In identifying available face buffers, the DSRU 315 preferably determines a percentage of system resources that are to be used by the Host 110b for supporting the image data processing processes which pass through the DSRU 315. Based upon this determination, the DSRU 315 then identifies an available number of face buffers to reflect the determined percentage of system resources.

More preferably, the DSRU 315 determines a percentage of system resources that are to be used by each image data processing process. For each image data processing process, the DSRU 315 sets aside a number of face buffers to reflect the determined percentage of system resources that are to be used by the Host 110b for supporting the image data processing process.

The DSRU 315 is available to receive face buffers requests from any of the services, such as PDL interpreter 311, printer subsystem 321, facsimile send application 411 and facsimile subsystem 421. However, the PDL interpreter 311 and facsimile send application 411 will request empty face buffers from the DSRU 315, and the printer subsystem 321 and facsimile subsystem 421 will request filled face buffers from the DSRU 315. Because the services operate independently, their requests to the DSRU 315 are made in an unpredictable order.

After one of the services requests a face buffer, whether empty or filled (step 615), the DSRU identifies an available number of face buffers which meet the criteria (step 620). For a request from the PDL interpreter 311 or the facsimile send application 411, the DSRU 315 simply identifies empty face buffers. For a request from the printer subsystem 321, the DSRU 315 identifies face buffers which have been filled by the PDL interpreter 311. Similarly, for a request from the facsimile subsystem 421, the DSRU 315 identifies face buffers which have been filled by the facsimile send application 411.

From a more general perspective, when an originator service requests an empty face buffer, the DSRU 315 identifies any empty face buffer. When a recipient service requests a filled face buffer, the DSRU 315 identifies only face buffers filled by the corresponding originator service. This preserves the integrity of the image data processing processes.

Proceeding to step 625, if at least one face buffer of the requested type is available, then the DSRU 315 returns a location of the one available face buffer to the requesting service (step 630). If the requesting service is an originator service, then the originator service fills the face buffer. If the requesting service is a recipient service, then the recipient service empties the face buffer.

If the DSRU 315 is unable to identify any face buffers of the requested type, then the DSRU delays until at least one face buffer of the requested type becomes available (step 635) and then the DSRU 315 returns a location of the face buffer to the requesting service (step 630). This delay may take any of a number of forms. The delay is preferably event driven, such that a release of a face buffer triggers the completion of a face request. Alternatively, the DSRU 315 may set a timer and await its expiration before rechecking for available face buffers of the requested type. The DSRU 315 might also place the request in a queue, service one or more other requests, and then return to requests in the queue. For requests for empty face buffers, the DSRU could simply operate on a first come, first served basis.

Preferably, the DSRU 315 includes a prioritization mechanism, and this prioritization mechanism is incorporated into the queue. The prioritization scheme preferably gives highest priority to walk-up users of the MFP 110a, then priority to print jobs, and lowest priority to fax jobs. The prioritization of a particular job is further increased with its elapsed delay tp prevent starvation. Also, recipient processes preferably have higher priority over origination processes.

With the request satisfied, the method continues at step 610 as discussed above to achieve dynamic allocation of face buffers. Alternatively, where the DSRU 315 will work with a fixed number of face buffers, the method would continue at step 615.

Figure 7:
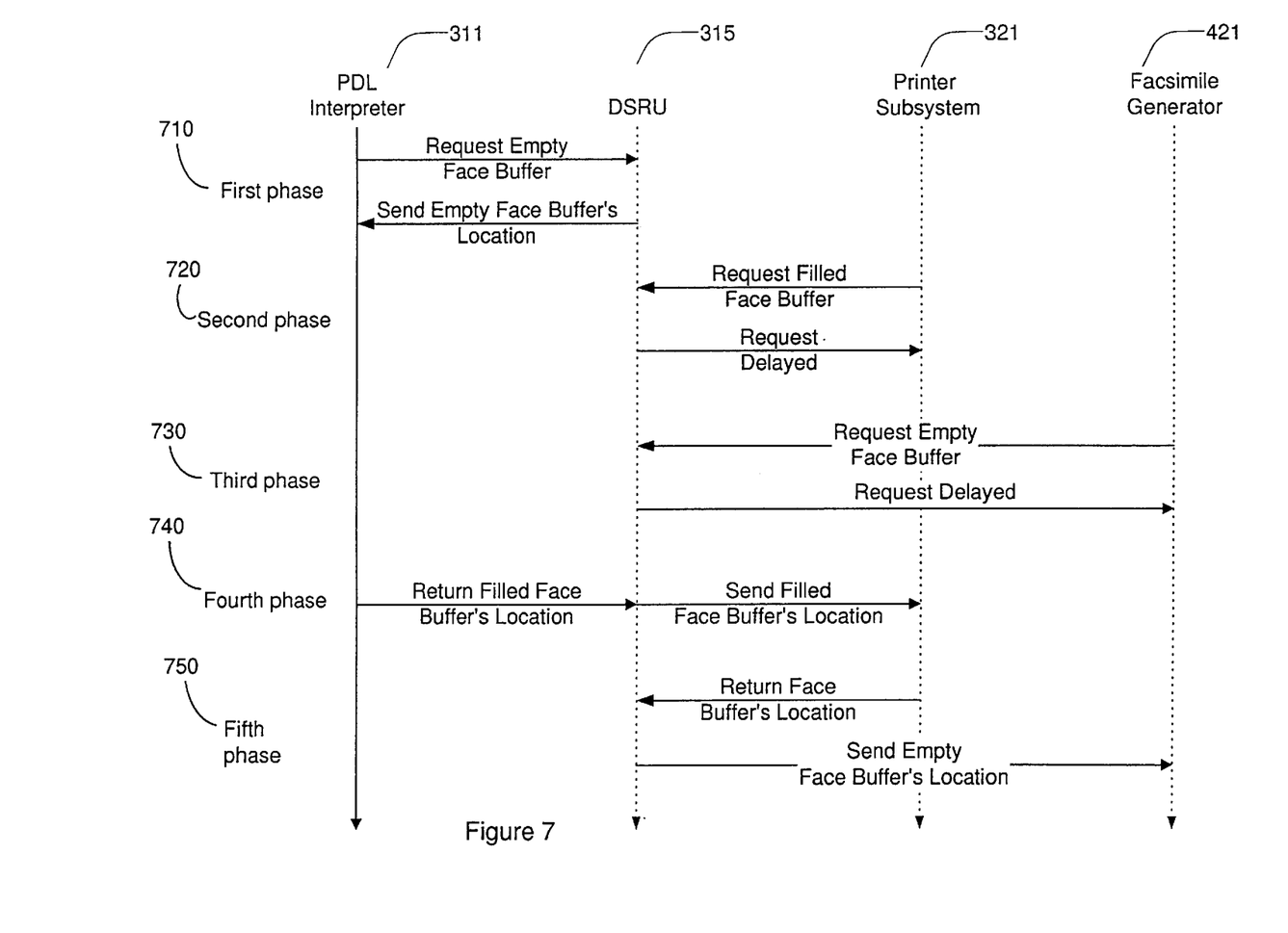
FIG. 7 is a first exemplary timing diagram illustrating a sequence of communications among the DSRU, the print system and the facsimile send system, in accordance with the invention.

FIG. 7 is timing diagram illustrating the method of FIG. 6 as applied to an examples where only a single face buffer remains available to the DSRU 315. The timing diagram of FIG. 7 has five phases.

In the first phase 710, the PDL interpreter 311 requests an empty face buffer from the DSRU 315 in connection with a print job that has been initiated, and DSRU 315 provides the location of the single available empty face buffer to the PDL interpreter 311.

In the second phase 720, the printer subsystem 321 requests a filled face buffer from the DSRU 315, the request corresponding to the print job. Since the DSRU 315 does not have any available filled face buffers for the printer subsystem 321, the request is delayed.

In the third phase 730, the facsimile send application 411 requests an empty face buffer from the DSRU 315, and the request is delayed since no empty face buffers are available.

In the fourth phase 740, the PDL interpreter 311 fills the face buffer and returns this fact to the DSRU 315 and, subsequently, the DSRU 315 forwards the location of the filled face buffer to the printer subsystem 321, thus vitiating the earlier delay that was sent to the printer subsystem 321 in the second phase 720.

In the fifth phase 750, the printer subsystem 321 processes the face of image data for forwarding to the MFP 110a, and provides an indication to the DSRU 315 that the face buffer can now be considered as empty or available. Upon receipt of the indication from the printer subsystem 321, shown as a returned face buffer in FIG. 7, the DSRU 315 sends the location of the now-available face buffer to the facsimile send application 411 in a fifth phase 750, to satisfy the request by the facsimile send application 411 in the third phase 730.

Figure 8:
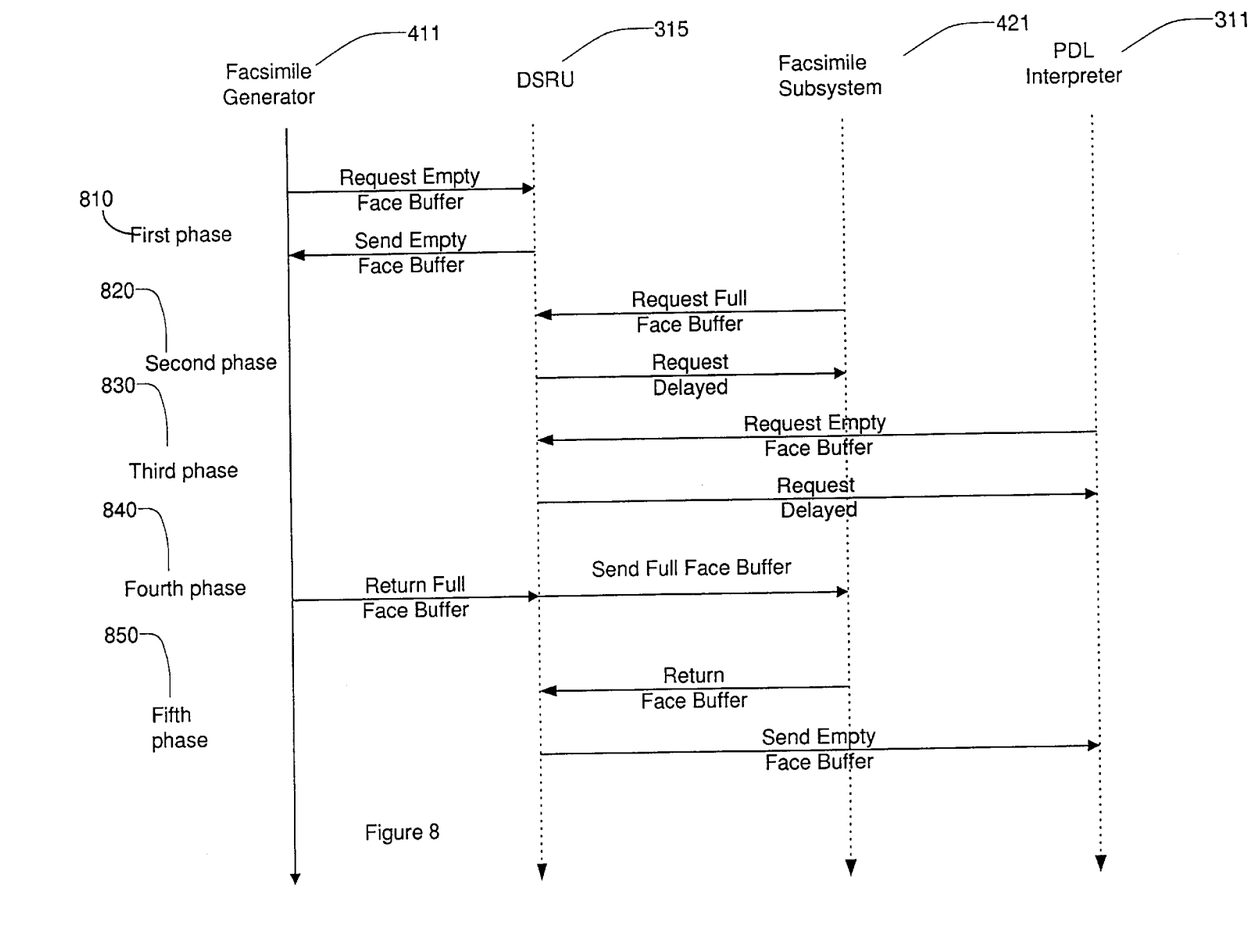
FIG. 8 is a second exemplary timing diagram illustrating a sequence of communications among the DSRU, the print system and the facsimile send system, in accordance with the invention.

FIG. 8 is another timing diagram illustrating the method of FIG. 6 as applied to another example where only a single face buffer remains available to the DSRU 315. The timing diagram of FIG. 8 illustrates a similar scenario where the facsimile send application 411 is the first to request a last-available empty face buffer from the DSRU 315. The timing diagram of FIG. 8 has five phases.

In the first phase 810, the DSRU 315 receives a request from the facsimile send application 411 for an empty face buffer and the DSRU fills the request.

In the second phase, the facsimile subsystem 421 sends a request to the DSRU 315 for a filled face buffer. The facsimile send application 411 has not yet filled the empty face buffer and in this example there are no other face buffers which the facsimile send application has filled. Therefore, the DSRU 315 replies to the facsimile subsystem 421 with a delay message.

In the third phase, the PDL interpreter 311 requests an empty face buffer from the DSRU 315. Since the facsimile send application 411 received the last empty face buffer, the DSRU 315 issues a delay message to the PDL interpreter 311.

In the fourth phase 840, the facsimile send application 411 completes the transfer of a face of image data into the face buffer and returns this to the DSRU 315. Because the facsimile subsystem 421 was waiting for a face buffer filled by the facsimile send application 411, the DSRU 315 provides the location of the filled face buffer to the facsimile subsystem 421.

In the fifth phase, the facsimile subsystem 421 processes the face of image data in the face buffer and notifies the DSRU 315 that the face buffer is empty. The DSRU 315 then forwards the location of the empty face buffer to the PDL interpreter 311 in response to the earlier request of the PDL interpreter 311.

In the examples of FIGS. 7 and 8, face buffers are supplied to the face buffer requesters based only on an availability, first-come first-served basis. A number of other assignment schemes for distributing the resources available to the DSRU 315 for servicing the print and facsimile send pipelines 530, 540 are within the scope of the invention. Various prioritizing schemes may be programmed or selected in accordance with the present invention. Additionally, the various prioritizing schemes for distributing face buffers among the pipelines may be dynamically selected in accordance with predefined criteria.

For example, a facsimile command containing faces of image data to be printed in low resolution form may provide a signal to the DSRU 315 to provide less throttling to the facsimile send pipeline, since the actual pages may be processed (faxed) by the fax/modem 210 at a higher rate.

In accordance with one aspect of the present invention, the throttling of the print pipeline and the facsimile send pipeline does not affect the ultimate output of hard copies printed by the MFP 110a and faxed by the fax/modem 210. Other prioritizing and resource allocation schemes may be implemented by the DSRU 315 to ensure that the final print and facsimile send outputs are not substantially delayed by the throttling of the DSRU 315.

In accordance with another alternative embodiment of the present invention, a user may input a number of resource-conserving modes before or during the processing of print and/or facsimile image data. A user wishing to place a high priority on a particular print job, for example, may transmit information with a print command from a workstation 150 to prioritize the particular print job over other facsimile and/or print jobs. Priority would be provided by assigning available face buffers to the particular print job even when, for example, a facsimile job was requested first.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

It is claimed:

1. A throttled pipeline within a host, the host being coupled to at least one general purpose computer workstation having an originator process and to an output device having a recipient process, the throttled pipeline being adapted to throttle a transfer-rate of data from the at least one general purpose computer workstation to the output device, to thereby conserve system resources of the host computer, wherein the originator process involves a transfer of data from the general purpose computer workstation to the output device; and wherein the recipient process receives the data from the originator process; the throttled pipeline comprising:

a data storage and retrieval unit operatively coupled between the at least one general purpose computer workstation and the output device, the data storage and retrieval unit being adapted to enable a selective transfer of data from the at least one general purpose computer workstation to the output device using face buffers, wherein each face buffer corresponds to a memory space that is adapted to hold a single data set therein, each data set having a predetermined size according to the type of face buffer, wherein the face buffer is selected from any available memory space that will receive that type of face buffer, and wherein data can only be transferred from the at least one general purpose computer workstation to the output device in data sets using face buffers supplied by the data storage and retrieval unit.

2. The throttled pipeline within a host computer as set forth in claim 1, further comprising a plurality of processes, wherein the data storage and retrieval unit is capable of throttling additional pipelines between multiple originator and recipient processes simultaneously; wherein a first process involves a transfer of data from a first originator to a first recipient; and wherein a second process involves a transfer of data from a second originator to a second recipient.

3. The throttled pipeline within a host computer as set forth in claim 2, wherein the data storage and retrieval unit is capable of assigning face buffers to a plurality of services and receiving the data in an unpredictable order.

4. The throttled pipeline within a host computer as set forth in claim 1, wherein if no face buffer of the requested type is available, the data storage and retrieval unit sets a timer and awaits its expiration before re-checking for available face buffers of the requested type.

5. The throttled pipeline within a host computer as set forth in claim 1, wherein if no face buffer of the requested type is available, the data storage and retrieval unit places the request in a queue, service one or more other requests, and then returns to the requests in the queue.

6. The throttled pipeline within a host computer as set forth in claim 1, wherein if no face buffer of the requested type is available, a prioritization mechanism is incorporated into a queue and acts to prioritize the requests in the queue.

7. A throttled pipeline within a host, the host being coupled to at least one general purpose computer workstation having a plurality of processes and to an output device having a plurality of processes, the throttled pipeline being adapted to throttle a transfer-rate of data from the at least one general purpose computer workstation to the output device, to thereby conserve system resources of the host computer, wherein the data storage and retrieval unit is capable of throttling additional pipelines between multiple originator and recipient processes simultaneously; wherein a first process involves a transfer of data from a first originator to a first recipient; and wherein a second process involves a transfer of data from a second originator to a second recipient; the throttled pipeline comprising:

a data storage and retrieval unit operatively coupled between the at least one general purpose computer workstation and the output device, the data storage and retrieval unit being adapted to enable a selective transfer of data from the at least one general purpose computer workstation to the output device using face buffers, wherein each face buffer corresponds to a memory space that is adapted to hold a single data set therein, each data set having a predetermined size according to the type of face buffer, wherein the face buffer is selected from any available memory space that will receive that type of face buffer, and wherein data can only be transferred from the at least one general purpose computer workstation to the output device in data sets using face buffers supplied by the data storage and retrieval unit.

8. The throttled pipeline within a host computer as set forth in claim 7, wherein the data storage and retrieval unit is capable of assigning face buffers to a plurality of services and receiving the data in an unpredictable order.

9. The throttled pipeline within a host computer as set forth in claim 7, wherein if no face buffer of the requested type is available, the data storage and retrieval unit sets a timer and awaits its expiration before re-checking for available face buffers of the requested type.

10. The throttled pipeline within a host computer as set forth in claim 7, wherein if no face buffer of the requested type is available, the data storage and retrieval unit places the request in a queue, service one or more other requests, and then returns to the requests in the queue.

11. The throttled pipeline within a host computer as set forth in claim 7, wherein if no face buffer of the requested type is available, a prioritization mechanism is incorporated into a queue and acts to prioritize the requests in the queue.

12. A system for apportioning resources of a host to a first image data processing process in the host by a data storage and retrieval unit in the host, the host comprising a processor and a memory, the first process involving a transfer of image data from a first originator service to a first recipient service, the system comprising:

a means for identifying an available number of face buffers in the host's memory by the data storage and retrieval unit, wherein a face buffer comprises a working region of memory for temporarily storing a face of image data;

a means for receiving requests for the face buffer from the services by the data storage and retrieval unit, wherein the first originator service requests empty face buffers and the first recipient service requests filled face buffers;

a means for identifying an available number of face buffers as requested by the data storage and retrieval unit;

a means for returning a location of the one available face buffer to the requesting service by the data storage and retrieval unit, if at least one face buffer of the requested type is available;

a means for filling the face buffer by the first originator service, if the requesting service is the first originator service;

a means for emptying the face buffer by the first recipient service, if the requesting service is the first recipient service;

a means for delaying by the data storage and retrieval unit, until at least one face buffer of the requested type becomes available, and then the data storage and retrieval unit returning a location of the face buffer to the requesting service, if the data storage and retrieval unit is unable to identify any face buffers of the requested type.

* * * * *